US012061631B1

(12) United States Patent
Marrone et al.

(10) Patent No.: US 12,061,631 B1
(45) Date of Patent: Aug. 13, 2024

(54) SYSTEMS AND METHODS FOR ACCOUNT CLASSIFICATION USING A MIDDLEWARE SYSTEM ARCHITECTURE

(71) Applicant: Citibank, N.A., New York, NY (US)

(72) Inventors: Michael Marrone, New York, NY (US); Gunjan Gupta, Irving, TX (US); Enitha Vishnupriya Ganesan, New York, NY (US); Matthew Olsen, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/531,873

(22) Filed: Dec. 7, 2023

(51) Int. Cl.
*G06F 16/00* (2019.01)
*G06F 16/28* (2019.01)
*G06Q 20/38* (2012.01)

(52) U.S. Cl.
CPC ......... *G06F 16/285* (2019.01); *G06Q 20/389* (2013.01)

(58) Field of Classification Search
None
See application file for complete search history.

(56) References Cited

U.S. PATENT DOCUMENTS

| | | | | |
|---|---|---|---|---|
| 7,478,062 B2 * | 1/2009 | Ansley | ................... | G06Q 40/12 705/37 |
| 7,814,019 B2 * | 10/2010 | Knapp | ................. | G06Q 20/042 705/45 |
| 8,700,525 B1 * | 4/2014 | Rafferty | ............... | G06Q 20/023 705/42 |
| 9,183,591 B2 * | 11/2015 | Anderson | ............ | G06Q 20/385 |
| 10,489,864 B1 * | 11/2019 | Werr | ....................... | G06Q 20/22 |
| 10,523,653 B2 * | 12/2019 | Hockey | ................. | H04L 9/3213 |
| 10,726,491 B1 * | 7/2020 | Hockey | ............... | H04L 63/1433 |
| 11,316,862 B1 * | 4/2022 | Pate | ........................ | G06F 21/44 |
| 2002/0116304 A1 * | 8/2002 | Casper | .................. | G06Q 40/02 705/35 |
| 2006/0206421 A1 * | 9/2006 | Knapp | .................... | G06Q 20/10 705/39 |
| 2013/0297414 A1 * | 11/2013 | Goldfarb | ................ | G06Q 40/02 705/14.51 |

(Continued)

FOREIGN PATENT DOCUMENTS

EP 2246815 A1 * 11/2010 ............. G06Q 20/40

*Primary Examiner* — Jean M Corrielus
(74) *Attorney, Agent, or Firm* — Foley & Lardner LLP

(57) ABSTRACT

A computer can connect with a middleware computing system. The middleware computing system may use application programming interfaces (APIs), webhooks, file-based integration, database replication, message queues, websockets, or direct integration to establish connections with different computing devices. The computer may request an account classification for an external account stored in a remote computing device. The middleware computing system can receive the request, identify the connection that the middleware computing device has with the remote computing device, and retrieve transaction records for transactions performed by the external account from the remote computing device. The middleware computing system can use metadata in the transaction records to automatically determine an account type of the account. The middleware computing system can generate instructions that cause the computer to link the external account with the profile.

18 Claims, 5 Drawing Sheets

(56) References Cited

U.S. PATENT DOCUMENTS

| | | | |
|---|---|---|---|
| 2013/0325697 A1* | 12/2013 | Allison, Jr. | G06Q 30/0631 |
| | | | 705/39 |
| 2014/0129442 A1* | 5/2014 | Hanson | G06Q 20/3221 |
| | | | 705/44 |
| 2015/0206252 A1* | 7/2015 | Rephlo | G06Q 40/12 |
| | | | 705/30 |
| 2017/0177809 A1* | 6/2017 | Bull | G16H 50/30 |
| 2017/0178245 A1* | 6/2017 | Rodkey | G06Q 40/02 |
| 2017/0316388 A1* | 11/2017 | Iyer | G06Q 20/405 |
| 2019/0014101 A1* | 1/2019 | Hockey | H04L 9/3228 |
| 2019/0114599 A1* | 4/2019 | Barrett | G06Q 20/045 |
| 2019/0205468 A1* | 7/2019 | Barnes, Jr. | G06F 16/635 |
| 2020/0250185 A1* | 8/2020 | Anderson | G06F 16/2358 |
| 2020/0394698 A1* | 12/2020 | Schoeny | G06Q 30/0629 |
| 2020/0402156 A1* | 12/2020 | Maitra | G06Q 40/02 |
| 2021/0209597 A1* | 7/2021 | Lewis | G06Q 50/265 |
| 2021/0217016 A1* | 7/2021 | Putnam | G06Q 20/3821 |
| 2021/0326980 A1* | 10/2021 | Thomas | G06Q 40/03 |
| 2021/0328975 A1* | 10/2021 | Selway | G06F 21/6218 |
| 2022/0138708 A1* | 5/2022 | Barakat | G06Q 20/3223 |
| | | | 705/39 |
| 2022/0217147 A1* | 7/2022 | Pate | G06F 21/45 |

* cited by examiner

400

| Class Value | Account Type |
|---|---|
| WEB | Consumer |
| PPD/PPD+ | Consumer |
| CCD/CCD+ | Business |
| CTX | Non-Consumer |
| DNE | Block |
| MTE | Consumer |
| POS | Consumer |
| RCK | Consumer |
| SHR | Consumer |
| TEL | Consumer |

FIG. 4

SYSTEMS AND METHODS FOR ACCOUNT CLASSIFICATION USING A MIDDLEWARE SYSTEM ARCHITECTURE

TECHNICAL FIELD

This application generally relates to account classification. In particular, the present application relates to account classification using a middleware system architecture and metadata of transaction records.

BACKGROUND

A common feature required for Automated Clearing House (ACH) transactions is the ability to link an external account to a profile to enable inbound or outbound transactions between the accounts at the receiving depository financial institution (RDFI) and the originating depository financial institution (ODFI). During the linking process, it is important to identify the types of the external accounts (e.g., consumer account or business account) to enable downstream computing systems to determine how to process data relating to the accounts. In one example, a downstream computing system may use identifications of the types of accounts to determine which algorithms to use to authenticate users associated with the accounts to authorize the linking and/or different transactions with which the accounts are associated.

SUMMARY

When linking accounts, computing devices of institutions may attempt to classify external accounts with data that is available to the institutions, either data that is stored locally or data that is stored in external data sources to which the computing devices have access. However, given that computing devices of institutions do not typically have direct application programming interface (API) connections with the vast network of computing devices associated with other institutions that can read and interpret transaction and account data, as well as a general lack of uniformity of account type classification data stored in databases across such institutions, there is an inherent technical challenge in confidently classifying account attributes, such as account type, for external accounts involved in transactions.

To overcome these challenges, a computer at an institution can connect with a middleware computing system that has pre-established connections with the computing devices of other institutions using APIs or other types of software systems or services, such as webhooks, file-based integration, database replication, message queues, websockets, direct integration, etc. Such a middleware computing system may establish the connections with the different computing devices to manage connections between accounts and/or profiles of the institutions. The computer at the institution may request an account classification for an external account stored in a remote computing device of another institution. The computer may transmit the request when linking the external account with a profile for the institution stored in memory of the computer. The middleware computing system can receive the request, identify the connection that the middleware computing system has with the remote computing device at the institution based on an identification of the institution in the request, and retrieve transaction records for transactions performed by the external account from the remote computing device of the institution. The middleware computing system can use metadata in the transaction records to automatically determine an account type of the account. The middleware computing system can generate instructions that cause the computer at the institution to link the external account with the profile and include an identification of the determined account type of the account in the profile to indicate the type of the external account that has been linked to the profile.

The middleware computing system may use specific types of metadata within the retrieved transaction records for the account to automatically determine an account type (e.g., consumer or business) for the account. For example, ACH transactions are typically required to have specific transaction metadata that is transmitted through the ACH Network. For instance, transaction records for ACH transactions typically include class (e.g., standard entry class (SEC) code) field-value pairs. The class field-value pair can include a code or value, such as WEB, PPD, PPD+, CCD, or CCD+ that indicates the context and/or the types of participants of a transaction. The middleware computing system computer can identify the values in the SEC field-value pairs of transaction records for transactions, such as for transactions that were performed within a defined time period (e.g., the previous two years). The middleware computing system can apply a rule-based engine to the values, such as to determine the most common class value or to determine whether a count of the number of a particular class value exceeds a threshold. The middleware computing system can automatically update an account type field with a commercial or consumer label based on the class value that satisfies a rule applied by the rule-based engine. The account type can be used to determine how to process data relating to the account (e.g., applying policies or authentication protocols).

Using class values to as a ground truth to determine account type classifications is beneficial because the class values are required to be accurate for ACH transactions. For example, when a transaction that is processed through the ACH computing network is completed, one of the entities that is a part of the transaction will send a message in a specific format for the transaction to the ACH computing network with the details of the transaction and a class value of the transaction. The ACH computing network can identify one or more rules in memory that correspond to the class value in the message and evaluate the format and the data of the message using the one or more rules. The ACH computing network will reject the transaction if the evaluated data of the message does not comply with rules associated the class value in the message. The ACH computing network is configured to do so to ensure the proper authorization techniques are used to process the transaction for data and fraud protection. Accordingly, the class values in transaction records are filtered out by the ACH computing network such that only accurate class values are used to complete transactions and middleware computing system can be configured to use the class values for account classification with a high success rate.

In some embodiments, a method includes establishing, by one or more processors, a connection via one or more application programming interfaces (APIs) with each of a plurality of remote computing devices, each of the plurality of remote computing devices corresponding to a different institution; in response to receiving, by the one or more processors, a request for an account type classification of an account, the request including an identification of an institution corresponding to a remote computing device of the plurality of remote computing devices, retrieving, by the one or more processors via the one or more APIs and over the connection with the remote computing device corresponding to the institution identified in the request, a plurality of transaction records each comprising a class value in a field-value pair corresponding to a class transaction attribute of the transaction record; automatically determining, by the one or more processors applying a rule-based engine, an account type of the account based on the class values in the plurality of transaction records; and generating, by the one or more processors, instructions containing the determined account type of the account to a computing device configured to link the account to a profile stored in memory of the computing device and store an identification of the account type in an account type field-value pair for the linked account in the profile.

In some embodiments, a system includes a network interface; a processor; and a non-transitory, computer-readable medium comprising instructions. The non-transitory, computer-readable medium can include instructions which, when executed by the processor, cause the processor to establish, via the network interface, a connection via one or more application programming interfaces (APIs) with each of a plurality of remote computing devices, each of the plurality of remote computing devices corresponding to a different institution; in response to receiving a request for an account type classification of an account, the request including an identification of an institution corresponding to a remote computing device of the plurality of remote computing devices, retrieve, via the one or more APIs and over the connection with the remote computing device corresponding to the institution identified in the request, a plurality of transaction records each comprising a class value in a field-value pair corresponding to a class transaction attribute of the transaction record; automatically determine, using a rule-based engine, an account type of the account based on the class values in the plurality of transaction records; and generate instructions containing the determined account type of the account to a computing device configured to link the account to a profile stored in memory of the computing device and store an identification of the account type in an account type field-value pair for the linked account in the profile.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

FIG. 4 illustrates an example mapping of class values to account types in accordance with an embodiment.

DETAILED DESCRIPTION

Figure 1:
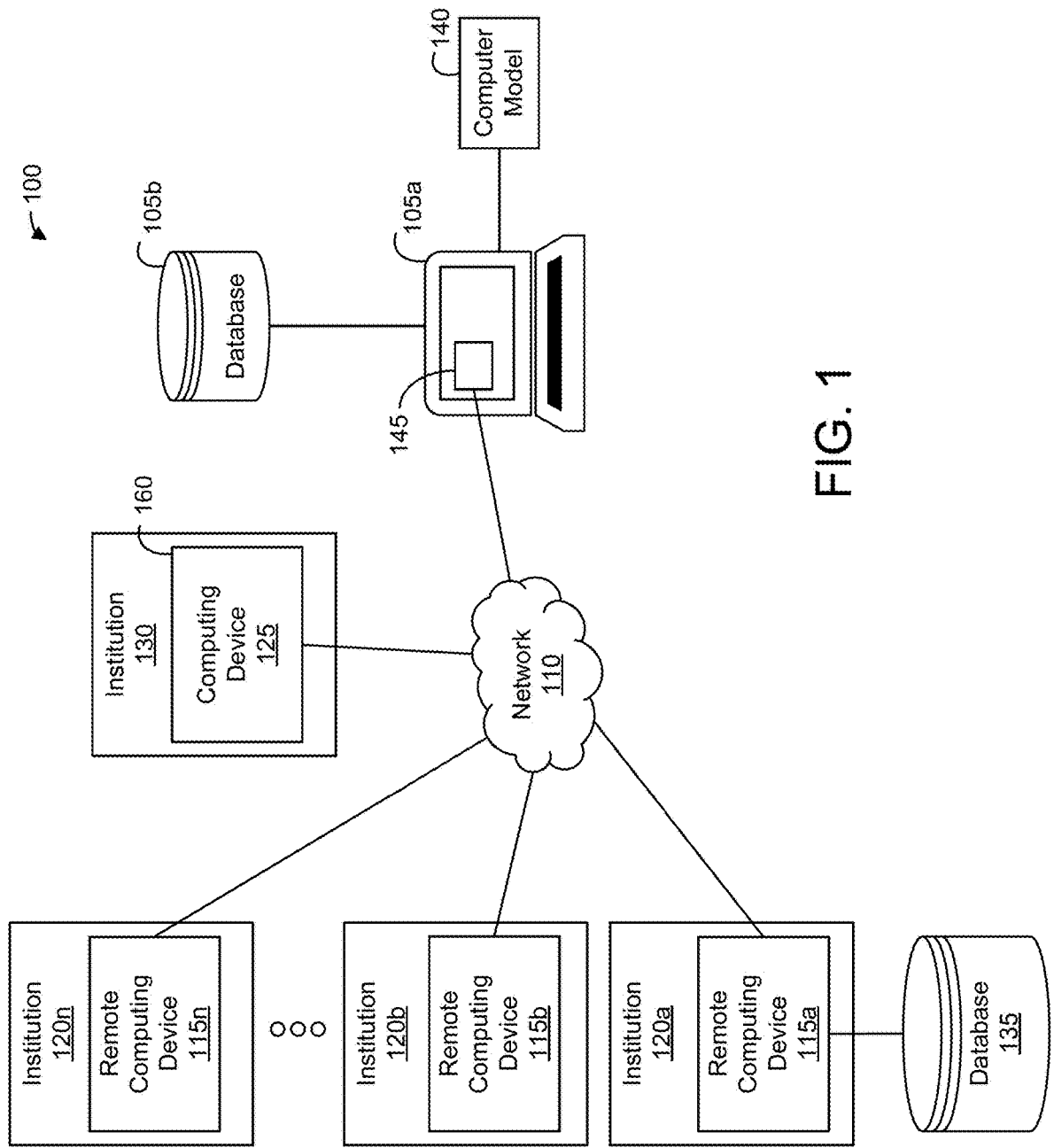
FIG. 1 illustrates a block diagram of an example system for account classification in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of account classification using a middleware system architecture. In a non-limiting example, a computing system can establish a connection with remote computing devices of different institutions. The computing system can do so using one or more application programming interfaces (APIs) (or other types of software systems or services) that are configured facilitate communication between the computing system and the remote computing devices of the different institutions. The computing system can receive, from a computing device at one institution, a request for an account type classification of an account of another institution. Responsive to receiving the request, the computing system can retrieve, using the one or more APIs and from a remote computing device of the institution of the account, transaction records of transactions performed through the account. The computing system can extract class values (e.g., Standard Entry Class (SEC) values) from the transaction records. The class values can indicate how to format and/or process transaction records based on the parties and/or types of the transactions and may be mandated or set by a regulatory entity (e.g., the National Automated Clearing House Association). The computing system can use a rule-based engine on the class values to determine an account type for the account. The computing system can generate instructions that contain the determined account type and transmit the instructions with the determined account type to the computing device that requested the account classification. Responsive to receiving the instructions, the computing device can link the account with a profile stored by the computing device by including an identification of the account classification in an account type field-value pair for the linked account in the profile. FIG. 1 depicts an example environment that includes example components of a system that includes the computing devices of the institutions and the computing system. Various other system architectures may include more or fewer features and/or may utilize the techniques described herein to achieve the results and outputs described herein. Therefore, the system depicted in FIG. 1 is a non-limiting example.

FIG. 1 illustrates components of an example account classification system 100, according to an embodiment. The system 100 may comprise an analytics server 105a, remote computing devices 115a-n (individually remote computing device 115 and together remote computing devices 115) of institutions 120a-n (individually institution 120 and together institutions 120), and a computing device 125 of an institution 130. The analytics server 105a of the system 100 may establish connections with computing devices of different institutions (e.g., financial institutions) and use the established connections to retrieve transaction data for account classification. For example, the analytics server 105a may be communicatively coupled to a system database 105b, and a computer model 140. The analytics server 105a can establish connections with the remote computing devices 115 and the computing device 125 via one or more application programming interfaces 145. The analytics server 105a can receive account classification requests for computing devices at different institutions (e.g., the institutions 120 and/or the institution 130) that include identifications of accounts of other institutions and include identifications of the institutions in which the accounts are stored. The analytics server 105*a* can select connections based on the identifications of the institutions and query the computing devices to retrieve transaction records for accounts over the selected connections. The analytics server can extract SEC values from the transaction records and apply rules to the Standard Entry Class (SEC) values to automatically determine classifications for the accounts. The analytics server can generate instructions containing the determined classifications and transmit the instructions to the requesting computing devices.

The above-mentioned components may be connected to each other through a network 110. The examples of the network 110 may include, but are not limited to, private or public LAN, WLAN, MAN, WAN, and the Internet. The network 110 may include both wired and wireless communications according to one or more standards and/or via one or more transport mediums.

The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets or another standard or proprietary wireless communication protocol. In another example, the network 110 may also include communications over a cellular network, including, e.g., a GSM (Global System for Mobile Communications), CDMA (Code Division Multiple Access), and/or EDGE (Enhanced Data for Global Evolution) network.

The institutions 120 and 130 may be any institutions that store data for accounts (e.g., consumer accounts or commercial accounts) that perform transactions. In one example, the institutions 120 and 130 may be credit unions or banks that store accounts for individual consumers and/or businesses through which the consumers and/or businesses can perform Automated Clearing House (ACH) transactions.

The institutions 120 and 130 can include the computing devices 115 and 125, respectively. The computing devices 115 and 125 can be configured to store such accounts for the respective institutions 120 and 130 in memory and/or separate databases, such as a database 135. The computing devices 115 and 125 may be any computing device comprising a processor and a non-transitory, machine-readable storage medium capable of performing the various tasks and processes described herein. Non-limiting examples of a computing device 115 and/or 125 can include a workstation computer, a laptop computer, a phone, a tablet computer, or a server computer. During operation, the computing devices 115 and/or 125 can transmit account classification requests to the analytics server 150*a* for external accounts stored in other computing devices 115 and/or 125 to use to link the external accounts with accounts or profiles stored in the respective computing devices 115 and/or 125. The computing devices 115 and/or 125 may be or include any type of computing device configured to store or process data for accounts and/or transactions performed through the accounts.

The database 135 is an example database that can be stored in memory of the remote computing device 115*a*. The database 135 can be a relational database or any other type of database. The database 135 can store data for separate accounts of the institutions 120*a*, as well as transaction records for respective accounts, in separate data structures. For instance, the database 135 can include a data structure for an account that includes the ACH transactions that have been performed through the account, a name of the entity that is associated with the account, and an identifier (e.g., an alphanumerical or numerical identifier) of the account. Each of the computing devices 115 and/or 125 can include and/or be coupled with a database that stores similar data for the respective institutions 120 and/or 130 to the database 135.

The database coupled with computing devices 115 and/or 125 may store different data and/or be configured to store data in different formats regarding accounts or transactions performed through the accounts. For example, the databases of the computing devices 115 and/or 125 may store identifications of account types of the accounts, but may store the identifications in varying forms (e.g., the identifications may be binary indicators, flags, or text strings) between the databases. Some databases may not store identifications of account types at all. Without a universal indicator of account type between databases, there may not be a way to consistently and accurately determine account types of accounts across the institutions 120 and/or 130.

The analytics server 105*a* may be or include any computing device comprising a processor and non-transitory machine-readable storage capable of executing the various tasks and processes described herein. Non-limiting examples of such computing devices may include workstation computers, laptop computers, server computers, laptop computers, and the like. The analytics server 105*a* may include one or more application programming interfaces (APIs) 145 that are configured to establish connections and facilitate communication with the remote computing devices 115 and the computing device 125. In some cases, the analytics server 105*a* can establish the connection with the remote computing device 115 and the computing device 125 via other types of software systems or services, such as webhooks, file-based integration, database replication, message queues, websockets, direct integration, etc.

While the system 100 includes a single analytics server 105*a*, in some configurations, the analytics server 105*a* may include any number of computing devices operating in a distributed computing environment.

The analytics server 105*a* can store or otherwise be coupled with a database 105*b*. The system database 105*b* can be a relational database, a graph database, MySQL, Oracle, Microsoft SQL, PostgreSql, DB2, document store, search engine, key-value store, etc. The database 105*b* configured to store mappings of SEC values to account types. For example, the database 105*b* can include or be a table that includes rows that include account-SEC value pairs or tuples in which each pair or tuple includes an SEC value and an identification of an account type that corresponds to the SEC value of the pair. The analytics server 105*a* can use the mapping to determine account types of accounts.

The analytics server 105*a* can establish connections with the computing devices 115 and computing device 125. For example, the analytics server 105*a* may establish transmission control protocol (TCP) connections with the computing devices 115 and the computing device 125 and leave the connections open (in some instances while sending keep-alive packets to the computing devices 115 and/or the computing device 125) to enable the analytics server 105*a* to query the computing devices 115 and the computing device 125 for transaction records to use to determine classifications of accounts. In one example, the analytics server 105*a* can transmit, via the APIs 145, syn packets to the computing devices 115 and the computing device 125 (or the computing devices 115 and the computing device 125 can transmit syn packets to the analytics server 105a) and establish the connections using a TLS handshaking protocol. The analytics server 105a can use any handshaking protocol to establish connections with the computers.

The analytics server 105a can establish the connections with the computing devices 115 and the computing device 125 prior to receiving any classification requests from the computing devices 115 and the computing device 125. The analytics server 105a can do so, for example, responsive to receiving an indication or message from the respective computing devices 115 and the computing device 125 requesting to connect with the analytics server 105a. Pre-establishing the connections may reduce latency in determining the classifications for accounts because the analytics server 105a does not have to perform a handshake operation to connect with the computing devices 115 or the computing device 125 each time that the analytics server receives a request to classify an account stored in or by the computing devices 115 and the computing device 125.

The analytics server 105a can receive a request for an account type classification of an account. The analytics server 105a can receive the request for the account type classification, for example, from the computing device 125. The analytics server 105a can receive the request from the connection that the analytics server 105a established with the computing device 125 via the one or more APIs 145. The request can include an identification (e.g., a numerical or alphanumerical value or string) of an institution (e.g., one of the institutions 120) and an identification (e.g., a numerical or alphanumerical value or string) of an account stored by the institution. Responsive to receiving the request, the analytics server 105a can select the connection (e.g., the pre-established connection) that the analytics server 105a established with the computing device 115 of the institution based on the identification of the institution in the request. The analytics server 105a can query the computing device 115 using the one or more APIs 145 and through the selected connection to retrieve transaction records (e.g., a plurality of transaction records) of transactions performed through the account identified in the request for the account type classification.

The analytics server 105a can process the retrieved transaction records to determine an account type (e.g., consumer or business) of the account. The analytics server 105a can do so based on the metadata of the retrieved transaction records. For example, the transaction records can each include a field-value pair for a class (e.g., SEC) transaction attribute of the transaction record. The class transaction attribute can indicate a type of processing or authorization that was performed to complete the transaction of the transaction record. The analytics server 105a can extract or identify the class value in the field-value pair for the class transaction attribute for each of the retrieved transaction records. The analytics server 105a can use the model 140 on the extracted class values to automatically determine an account type of the account.

For instance, the analytics server 105a can use the mapping stored in the database 105b in combination with the model 140 to determine the account type of the account. For example, the model 140 can be a rule-based engine that is configured to apply one or more rules to class values of transaction records of an account to determine an account type for the account. The analytics server 105a can apply criteria to the class values, such as identifying the class value that is the most common within the retrieved transaction records, identifying the class value identified in a number of the retrieved transaction records a number of times that exceeds a threshold, identifying a defined number (e.g., two or more) of class values that are the most common within the retrieved transaction records, identifying the class value in a transaction record that includes the most recent timestamp, etc. The analytics server 105 can use the model 140 to identify a class value that satisfies such criteria.

The analytics server 105 can use the mapping stored in the database 105b to determine an account type. For example, subsequent to determining a class value that satisfies a criterion using the model 140, the analytics server 105 can compare the determined class value with the mapping in the database 105b. Based on the comparison, the analytics server 105 can identify an account type that has a stored association with the class value that was determined to satisfy the criterion. In doing so, the analytics server 105 can identify the account type for the account.

The analytics server 105 can generate instructions based on the identified account type for the account. The analytics server 105 can generate the instructions to contain an identification of the account type that the analytics server 105 determined for the account. The analytics server 105 can transmit the instructions to the computing device 125 that transmitted the initial request to classify the account.

The computing device 125 can receive the instructions containing the identification of the account type. The computing device 125 can link the account to a profile (e.g., another account) stored in memory or a database of the computing device 125. The computing device 125 can store the identification of the account type in an account type field-value pair for the linked account in the profile.

Figure 2:
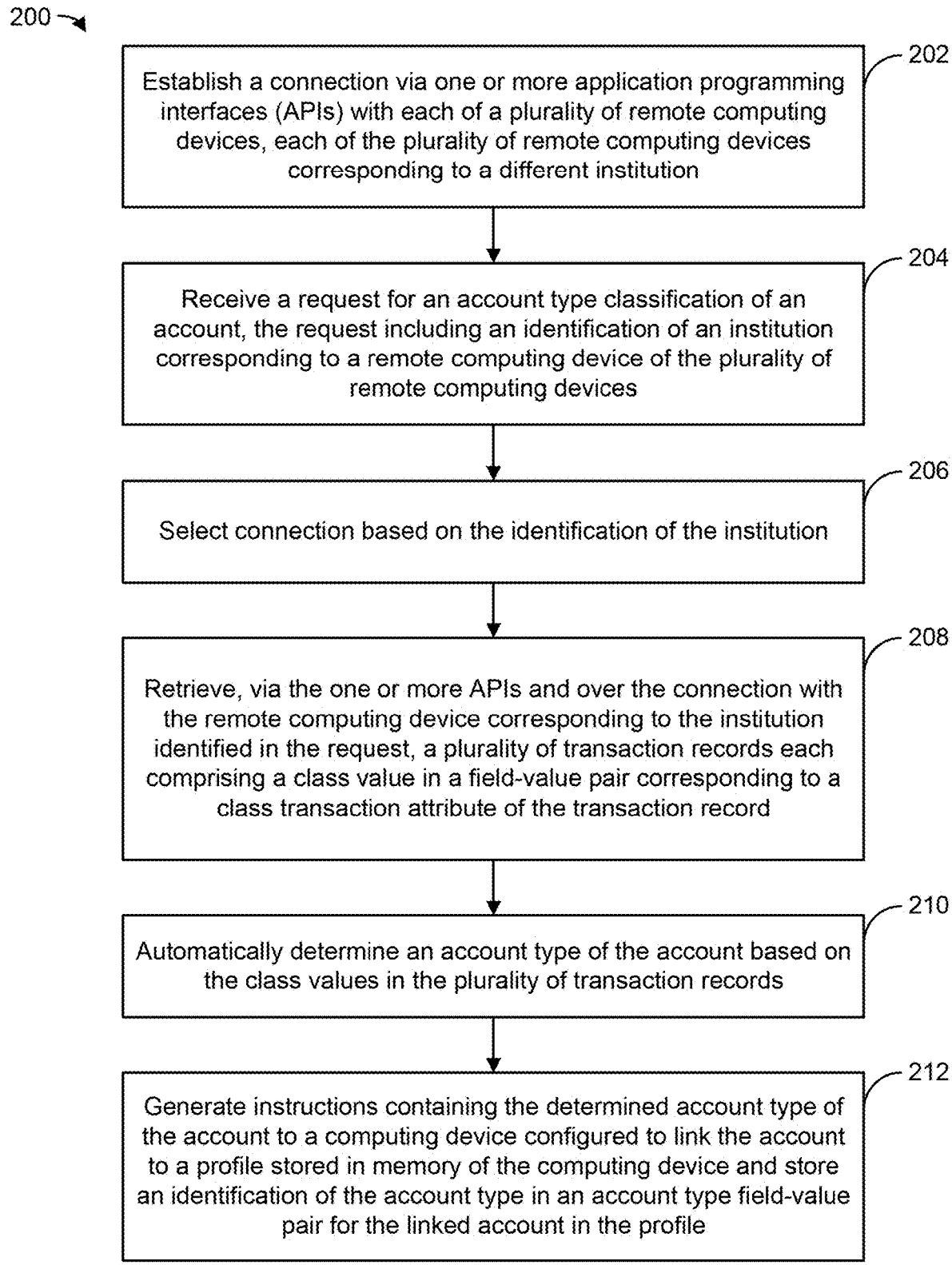
FIG. 2 illustrates a flow diagram of an example method for account classification in accordance with an embodiment.

FIG. 2 illustrates a flow diagram of an example method 200 for account classification in accordance with an illustrative embodiment. However, other embodiments may include additional or alternative execution steps, or may omit one or more steps altogether. The method 200 is described as being executed by a server, similar to the analytics server described in FIG. 1. However, one or more steps of the method 200 may also be executed by any number of computing devices operating in the distributed computing system described in FIG. 1. For instance, one or more computing devices (e.g., user devices) may locally perform part or all of the steps described in FIG. 2. Moreover, one or more of the steps of the method 200 can be performed via any processor of the system, such as any processor of the system 100.

At step 202, the analytics server establishes a connection with each of a plurality of remote computing devices. The analytics server can establish the connection using or via one or more application programming interfaces (APIs) that are configured to communicate with the plurality of remote computing device. In some cases, the analytics server can establish the connection via a different type of software system or service, such as a webhook, file-based integration, database replication, a message queue, a websocket, direct integration, etc. The remote computing devices can be computing devices of computing systems of institutions (e.g., financial institutions). The remote computing devices can be configured to store and/or facilitate transactions for the respective institutions. For example, the remote computing devices can store accounts for individuals or businesses that the individuals or businesses can use to make purchases and/or store a record of currency that the individuals or businesses have stored with the institutions. As the individuals perform transactions through the respective accounts, the remote computing devices can interact with an automated clearinghouse (ACH) computing system to complete transactions and store transaction records for the completed transactions.

The analytics server can establish the connections with the remote computing devices responsive to receiving requests to do so from the remote computing devices. The remote computing devices may send such requests, for example, because the analytics server is configured to facilitate linking accounts of different institutions with accounts, applications, and/or services hosted by other institutions or entities. The remote computing devices may send requests to establish connections with the analytics server to pre-emptively enable linking accounts stored by the institutions such that the analytics server or the institutions do not need to establish new connections each time an account from one institution is being linked to an account or profile of another institution or to a service or application. Thus, the analytics server can reduce latency and the processing resources that are required to link account or profiles to accounts or profiles of institutions.

The analytics server can establish connections with the remote computing devices over a network. The analytics server can do so, for example, using a Transport Layer Security (TLS) handshaking protocol or any other protocol through which computing devices can establish connections or communication channels. The analytics server can establish the connections by transmitting messages to the remote computing devices to initiate the handshaking protocol or responsive to receiving such messages from the remote computing devices. The analytics server can establish connections with computing devices of any number of institutions.

In operation 204, the analytics server can receive a request for an account type classification of an account. The request can be a request for a classification (e.g., consumer or commercial) for the account that the computing device can use to process actions perform for or through the account, such as for account authentication. The request can include an identification of an account and an identification of an institution corresponding to a remote computing device of the remote computing devices to which the data processing system has established connections. The data processing system can receive the request from a computing device that is linking the account to a profile (e.g., another account) of an institution, service or application and stored by the computing device or by another computing device associated with (e.g., operated by) the institution, service, or application.

In one example, a user with an account of Institution A may be attempting to link the account to a profile (e.g., another account) that the user has with Institution B. To do so, the user may access a computing device to transmit a linking request to a computing device of Institution B. In response to receiving the linking request, the computing device of Institution B may transmit a request for an account type classification to the analytics server. The request may include an identification of the user's account with Institution A and an identification of Institution A. In response to receiving the request, the analytics server can process the request to determine the account type for the account of Institution A.

In operation 206, the analytics server can select a connection. The analytics server can select the connection based on the identification of the institution in the request. For example, the analytics server can identify the identification of the institution from the request and select the connection that the analytics server has pre-established with the remote computing device of the institution from the plurality of pre-established connections based on the identification of the institution. Because the analytics server has already established the connection with the remote computing device of the institution, the analytics server may not have to spend time or processing resources establishing a new connection or new communication channel for the request.

In operation 208, the analytics server can retrieve transaction records for the account. The analytics server can retrieve the transaction records from the remote computing device over the selected connection and via the one or more APIs through which the analytics server established the connection. For example, the analytics server can query the remote computing device by transmitting a request including the identification of the account to the remote computing device. The remote computing device can use the identification of the account as a key to query a local database containing transaction records for different accounts to retrieve transaction records (e.g., a plurality of transaction records) for the account identified in the query. The remote computing device can transmit the transaction records back to the analytics server.

Figure 3:
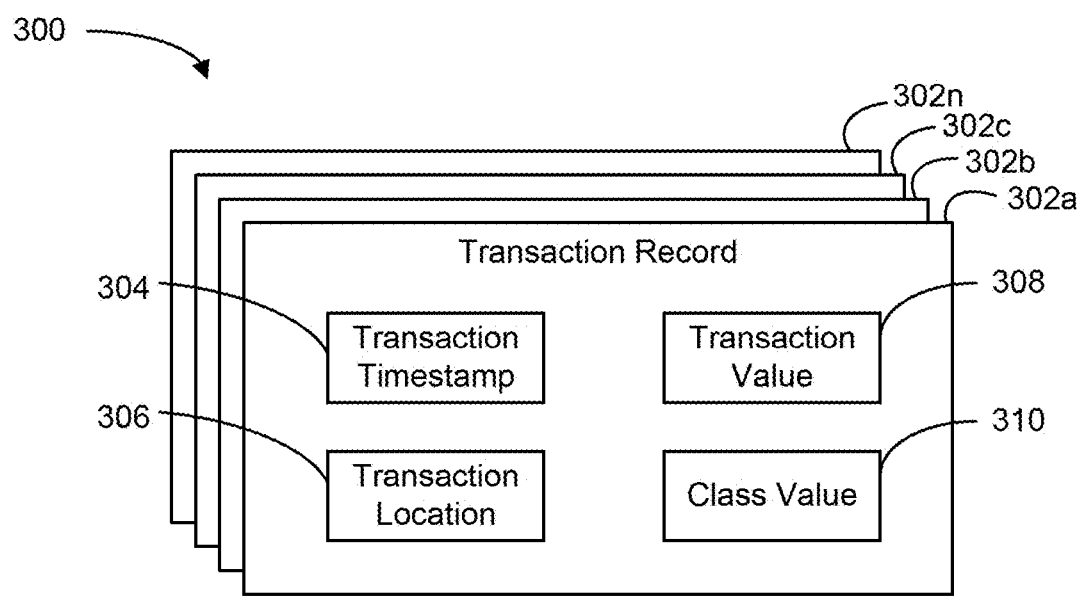
FIG. 3 illustrates example transaction records in accordance with an embodiment.

FIG. 3 illustrates example transaction records 302a-n (transaction records 302 or transaction record 302) that the remote computing device may transmit to the analytics server in response to the query for transaction records for the account. The transaction records 302 can each correspond to a different transaction (e.g., credit purchase, debit purchase, deposit, withdrawal, etc.) performed through the account. One or more or each of the transaction records 302 can include a transaction timestamp 304, a transaction location 306, a transaction value 308, and/or a class value 310 that each correspond to the transaction for which the transaction record 302 was generated. The transaction timestamp 304 can include a time and/or date of the transaction. The transaction location 306 can include a location of the transaction (e.g., coordinates of the location in which the transaction completed, an identification of the organization through which the transaction was completed, etc.). The transaction value 308 can indicate a numerical value for the transaction, such as a cost or amount exchanged with the transaction. The class value 310 can be a value that indicates how the transaction was processed for completion by an ACH computing network. The class value 310 can indicate authentication protocols that were used to complete the transaction as well as formats of the messages that were sent to perform the transactions. The transaction records 302 can include the values for the components 304-310 in field-value pairs corresponding to the attributes of the respective components 304-310.

The class value 310 can be or include a Standard Entry Class (SEC) code. For example, the class value 310 can be a three-character code that identifies the type and nature of an ACH transaction. These codes can be used determine the rules, regulations, and formats that are applicable to each transaction. For instance, codes like 'PPD' for prearranged payments and deposits, 'WEB' can for internet-initiated entries, and 'TEL' for telephone-initiated entries are used. The class value 310 can enhance the accuracy and data protection of transaction processing and reduce the risk of errors of transaction processing with the ACH computing network.

Transactions performed by different account types (e.g., consumers and businesses) of entities may correspond to class values that correspond to the specific account types because there may be different authorization techniques and/or requirements between transactions performed by consumers than for businesses. For example, transactions performed by a consumer may have more protections to avoid fraud than transactions performed by businesses. The class values can be used for categorizing and processing electronic transactions efficiently and securely within the ACH computing network. The class values can help in ensuring that the transactions adhere to the rules and data formats appropriate for the nature of the payment and the entities involved.

Referring again to FIG. 2, at step 210, the analytics server can determine an account type for the account. The analytics server can automatically determine the account type for the account based on the data (e.g., the metadata) of the transaction records that the analytics server retrieved for the account from the remote computing device. For example, the analytics server can extract the class values from the transaction records. The analytics server can apply a rule-based engine to the extracted class values to determine an account type for the account of the transaction records.

The rule-based engine can be or include a set of instructions executable by the analytics server that are configured to apply one or more rules to extracted class values to determine an account type that corresponds to the extracted class values. The rule-based engine can determine account types for accounts using a mapping of class values to account types. For example, the rule-based engine can generate a mapping. The rule-based engine can generate the mapping based on user-inputs, for example. The mapping can include mappings or stored associations between class values and account types. The mapping can be a table in a database stored in the analytics server with rows that each include an account type-class value pair that indicates which account types correspond to which class values.

For example, FIG. 4 illustrates an example mapping 400 between class values and accounts. The mapping 400 can include two columns, a class value column 402 and an account type column 404. The class value column 402 can include values for different class values (e.g., SEC values), such as WEB, PPD/PPD+, CCD/CCD+, CTX, DNE, MTE, POS, CK, SHR, and/or TEL. The account type column 404 can include identifications of different account types, such as consumer, commercial, non-consumer, and/or block. The values in the same rows of the mapping 400 may be values of account type-class value pairs. The mapping 400 can be configured by a user. Note that the values in the mapping 400 may not be comprehensive and may include fewer or more classes depending on the implementation. The analytics server can use the mapping 400 to determine account types based on class values in the transaction records that the analytics server retrieves.

Referring again to FIG. 2, the analytics server can use the rule-based engine to apply rules to the extracted class values from the transaction records of the account to determine, select, or identify an account value that satisfies a rule from the extracted account values. In one example, the analytics server can determine a class value that satisfies a rule by determining a most common class value of the extracted class values from the plurality of transaction records. The analytics server can instantiate a counter for each unique class value (e.g., instantiate a plurality of counters) of the extracted class values and increment the counters for each class value that the analytics server identifies from the extracted values that corresponds with the counter. The analytics server can identify the class value associated with the counter with the highest count of the counters as being the most common class value of the extracted class values. In another example, the analytics server can similarly instantiate and increment counters for the class values but use a threshold to identify a class value that satisfies a rule. The analytics server can compare the counts of the counters to the threshold (or respective thresholds specific to the individual class values). The analytics server can determine a class value satisfies a rule responsive to determining the count of the counter associated with the class value exceeds a threshold based on the comparison. In another example, the analytics server can identify the class value of the most recently performed transaction. The analytics server can identify the timestamps in the transaction records retrieved from the remote computing device and identify the transaction record that includes the most recent timestamp. The analytics server can identify the class value in the identified transaction as the class value that satisfies a rule. Using such rules can improve the accuracy of the account-type determinations given that there may be errors in storage or generation of individual transaction records such that a single class value may not be accurate for account type classification.

For example, the analytics server can retrieve transaction records for an account A that is being linked to a profile A. The analytics server can extract class values from the transaction records that indicate how the transactions of the transaction records were processed and/or authorized. Responsive to doing so, the analytics server can instantiate a different counter for each class value. The analytics server can increment the counters for each instance of the class values that correspond to the respective counters that is included in the extracted class values. The analytics server can compare the counts of the counters with each other to identify the highest count. The analytics server can identify the class value of the counter associated with the highest count to use to determine the account classification for the account A.

The analytics server can use the mapping and identified class value to determine a type of account for the account. For example, the analytics server can use a class value that the analytics server identified using the rule-based engine as a key when querying the mapping. The analytics server can identify the account type-class value pair that includes the class value from the mapping based on the query. The analytics server can identify the account type of the identified account type-class value pair. The identified account type can be the account type for the account.

In some configurations, the analytics server can determine multiple class values satisfy the rules applied by the rule-based engine, such as by determining multiple class values are associated with counters that exceed a threshold or determining a defined number of two or more class values with the most common counts. The mapping can include different permutations of many-to-one mappings in which multiple class values are mapped to a single account type. The analytics server can compare the class values to the many-to-one mappings and identify a mapping that includes (e.g., only includes) the multiple class values that satisfy the one or more rules. The analytics server can identify the account type of the mapping as the account type for the account.

In some configurations, the analytics server can use a machine learning model (e.g., a support vector machine, a neural network, a random forest, etc.) to determine account types for accounts. For example, the analytics server can execute a machine learning model that has been trained to automatically identify class values to use for account classification based on class values. The analytics server may input the extracted class values from the transaction records into the machine learning model. The analytics server can execute the machine learning model. The execution can cause the analytics server to output a class value for the account. The analytics server can use the rule-based engine to compare the class value to the mapping to identify an account type (e.g., consumer or business) for the account.

In some configurations, instead of using a machine learning model that is trained to determine a class value, the analytics server can use a machine learning model (e.g., a support vector machine, a neural network, a random forest, etc.) that is trained to identify account types for accounts. The analytics server may input the extracted class values from the transaction records into a machine learning model that has been trained to automatically identify account types based on class values. The analytics server can execute the machine learning model. The execution can cause the analytics server to output an account type for the account.

The aforementioned machine learning models may have been trained using backpropagation techniques with a loss function (e.g., using supervised learning techniques). For example, the analytics server can generate a training data set that includes sets of class values (e.g., historical class values) each labeled with a ground truth class value or account type, depending on the output the model is being trained to generate. The analytics server can individually feed the sets of class values into the machine learning model and execute the machine learning model for each input to generate a predicted class value or account type for the input. For each input, the analytics server can determine, for example by using a loss function, a difference between the predicted class value or account type and the label for the input set of class values. The analytics server can use backpropagation techniques based on the difference to adjust the internal weights and/or parameters of the machine learning model. The analytics server can repeat this process for each set of class values and corresponding label over time. The analytics server can determine an accuracy of the machine learning model during this training phase and deploy or implement the machine learning model for account classification responsive to determining the machine learning model has reached an accuracy threshold.

The analytics server can filter out which transaction records or class values to use for account classification. The analytics server can filter the transaction records based on the class values in the transaction records and/or based on the timestamps of the transaction records. For example, the analytics server can query the retrieved transaction records for transaction records with timestamps that are within a defined time period (e.g., the past two years) to identify a set of transaction values of transactions performed within the defined time period. In another example, the analytics server can query the retrieved transaction records that have one of a defined set of class values to identify a set of transaction values. The analytics server may only use the class values of the set of transaction records to determine or identify a class value that satisfies a rule or to use as input into a machine learning model for account classification. In doing so, the analytics server may avoid using stale data and/or can adjust for changes in account type and/or changes is class values that are included in transaction records that may occur over time.

In some configurations, the analytics server can filter out the transaction records that the analytics server retrieves from the remote computing device. For example, when the analytics server retrieves the transaction records for the account, the analytics server can transmit a request to the remote computing device requesting transaction records for the account that satisfy defined criteria, such as transaction records that include a timestamp within a defined time period or that include a class value of a defined set of class values. The remote computing device may retrieve the transaction records that satisfy the request and transmit the retrieved transaction records to the analytics server for account type classification. Thus, the analytics server can reduce the processing resources in filtering which transaction records to use for account type classification.

In step 212, the analytics server generates instructions containing the determined account type of the account. The analytics server can include the determined account type in the instructions as a flag or identification (e.g., a binary indication) indicating the account type of the account. The flag or identification can indicate the account is a consumer account or a commercial account, for example. The analytics server can transmit the instructions containing the determined account type of the account to the computing device that transmitted the request for the account classification to the analytics server.

The computing device can use the determined account type to link the account to a profile stored by the computing device. The profile can be or include another account of an institution, a profile of an application, a profile of a service, etc. The computing device can link the account with the profile by inserting an identification of the account in the profile and/or inserting an identification of the account type in an account type field-value pair for the linked account in the profile.

Linking the account with the profile can enable data regarding the account and/or profile to be transferred between the computing devices storing the account and/or profile. For example, the computing device can link the account with the profile by establishing a secure connection between the account and profile. The connection can be one-way such that only one of the account or the profile can view the data within the other of the account or the profile or two-way such that account and profiles can view the data of the other (e.g., the user can view the data of the account or profile while accessing the other of the account or profile). In some cases, the currency can be transferred between the account and profile over the connection in a similar one-way or two-way link. Encryption techniques can be implemented for the link to protect the data being transferred between the account and profile.

The computing device can use the determined account type for the account to verify the name and/or owner for the account for linking. For example, the computing device can store different sets of authentication rules for consumer accounts versus commercial accounts. The rules can be string matching rules. For instance, the computing device can store a set of rules relating to consumer accounts that compare first names and also compare last names of accounts of accounts for authentication. The computing device can authenticate the external account as a consumer account based on the one or both of the first names and the last names matching and/or one or both the first names and last names matching within a threshold (e.g., a threshold of an edit distance function). The computing device can store a set of rules relating to commercial accounts that identify whether the commercial accounts have matching organization types (e.g., "Inc.," "LLC," "LLP," etc.) in the names. The computing device can identify the account type of the external account being linked with the profile from the identification and retrieve the set of rules based associated with the account type. The computing device can apply the retrieved set of rules to the names or identifiers associated with the external account and the profile to determine whether the names match. Responsive to determining the retrieved set of rules is satisfied (e.g., the names of the account and profile match within a threshold of the set of rules), the computing device can link the account with the profile.

The computing device can use the identifications of the types of account implement one or more policies. For example, the computing device can implement one or rules that facilitate transactions (e.g., transfers) that can be performed with specific types of external accounts.

Figure 5:
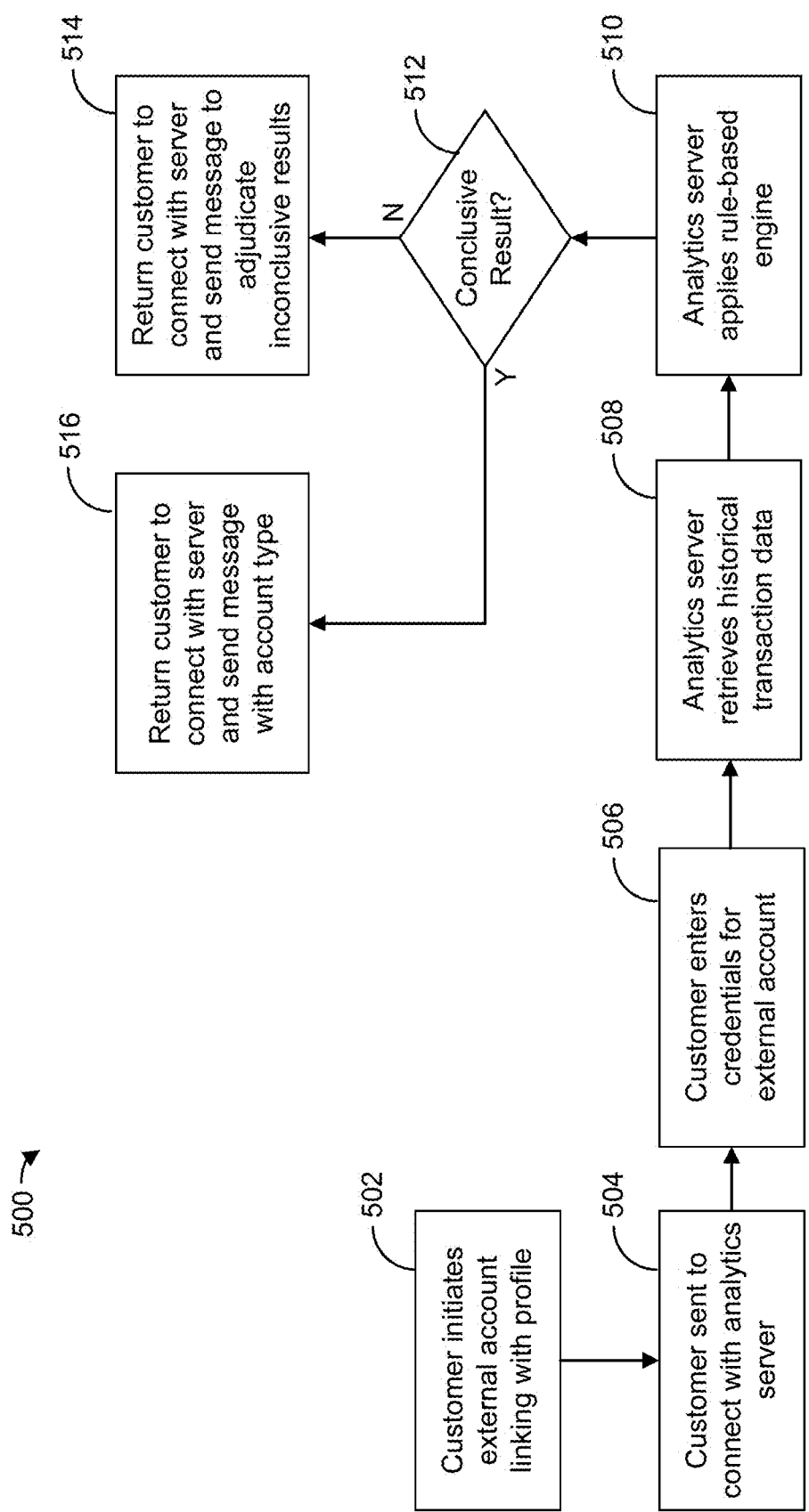
FIG. 5 illustrates a flow diagram of an example method for account classification in accordance with an embodiment.

FIG. 5 illustrates a flow diagram of an example method 500 for account classification in accordance with an illustrative embodiment. However, other embodiments may include additional or alternative execution steps, or may omit one or more steps altogether. The method 500 is described as being executed by a server, similar to the analytics server described in FIG. 1. However, one or more steps of the method 500 may also be executed by any number of computing devices operating in the distributed computing system described in FIG. 1. For instance, one or more computing devices (e.g., user devices) may locally perform part or all of the steps described in FIG. 5. Moreover, one or more of the steps of the method 500 can be performed via any processor of the system, such as any processor of the system 100.

At step 502, a computing device initiates an external account linking via a user interface. The computing device can initiate the external account linking by transmitting a request to a server of an institution A. For example, the server can generate and transmit a user interface to the computing device. Through the user interface, a user accessing the computing device can provide an input indicating to link an external account with an account or profile the user has with the institution A.

Responsive to initiating the linking of the external account, at step 504, the computing device can connect with an analytics server. The analytics server can generate a user interface that includes fields to input an identification and/or authorization credentials for the external account that the user is seeking to link with the account or profile of Institution A. At step 506 the user can input the respective values into the fields at the user interface. In doing so, the user can input an identification of the account as well as an identification of Institution B in which the account is stored. At step 508, the analytics server can receive the input and retrieve historical transaction records (e.g., transaction records with timestamps within a predefined time period, such as two years) from a remote computing device of the institution B that stores data for the external account. In doing so, the analytics server can use a pre-established connection with the remote computing device.

At step 510, the analytics server can use a rule-based engine and/or a machine learning model on the class values of the transaction records to determine an account type for the external account. Responsive to determining at step 512 that no account type could be determined (e.g., because the class values of the transaction records did not satisfy any rules or because the machine learning model output an indication that no account type could be determined), at step 514, the analytics server can transmit a message to the computing device and/or server indicating no account type could be determined. When this occurs, the server may generate a user interface that includes a field for the user to input an account type. However, responsive to determining an account type at step 516, the analytics server can transmit the determined account type to the server and send a message to the computing device indicating to reconnect with the server. The server can store an identification of the account type for the account in the profile. The server can use authentication rules on the names of the account and profile according to the account type. Responsive to determining the authentication rules are satisfied, the server can link the account with the profile. The server can send an indication of the successful link to the computing device over the connection.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   storing, by one or more processors, a mapping between class values and account types;
   establishing, by the one or more processors, a connection via one or more application programming interfaces (APIs) with each of a plurality of remote computing devices, each of the plurality of remote computing devices corresponding to a different institution;
   in response to receiving, by the one or more processors, a request for an account type classification of an account, the request including an identification of an institution corresponding to a remote computing device of the plurality of remote computing devices, retrieving, by the one or more processors via the one or more APIs and over the connection with the remote computing device corresponding to the institution identified in the request, a plurality of transaction records each comprising a class value in a field-value pair corresponding to a class transaction attribute of the transaction record;
   automatically determining, by the one or more processors applying a rule-based engine and based on the mapping between class values and account types, an account type of the account based only on a comparison between the class values in the plurality of transaction records and the mapping between class values and account types; and
   generating, by the one or more processors, instructions containing the determined account type of the account to a computing device configured to link the account to a profile stored in memory of the computing device and store an identification of the account type in an account type field-value pair for the linked account in the profile.

2. The method of claim 1, wherein retrieving the plurality of transaction records comprises transmitting, by the one or more processors via the one or more APIs over the connection with the remote computing device, a query comprising an identification of the account to the remote computing device.

3. The method of claim 1, wherein determining the account type of the account comprises:
   determining, by the one or more processors applying the rule-based engine, a most common class value of the class values of the plurality of transaction records; and
   determining, by the one or more processors applying the rule-based engine, the account type based on the account type having a stored association with the determined most common class value in the mapping.

4. The method of claim 1, wherein determining the account type of the account comprises:
   determining, by the one or more processors applying the rule-based engine, a set of two or more class values of the class values of the plurality of transaction records satisfy a criterion; and
   determining, by the one or more processors applying the rule-based engine, the account type based on the account type having a stored association with the determined set of two or more class values in the mapping.

5. The method of claim 1, wherein determining the account type of the account comprises:
   identifying, by the one or more processors applying the rule-based engine, a transaction record of the plurality of transaction records based on the transaction record including a most recent timestamp;
   identifying, by the one or more processors applying the rule-based engine, a class value in the identified transaction record; and
   determining, by the one or more processors applying the rule-based engine, the account type based on the account type having a stored association with the identified class value in the mapping.

6. The method of claim 1, wherein determining the account type of the account comprises:
   determining, by the one or more processors applying the rule-based engine, a count of a class value within the class values of the plurality of transaction records satisfies a threshold; and
   determining, by the one or more processors applying the rule-based engine, the account type based on the account type having a stored association with the class value with the count that satisfies the threshold in the mapping.

7. The method of claim 1, wherein determining the account type of the account comprises:
   executing, by the one or more processors, a machine learning model using the class values of the plurality of transaction records as input to cause the machine learning model to output the account type, wherein the machine learning model is trained based on historical class values of a plurality of historical transaction records.

8. The method of claim 1, further comprising:
identifying, by the one or more processor, a set of transaction records from the plurality of transaction records that include one of a defined set of class values, wherein determining the account type of the account comprises determining, by the one or more processors applying the rule-based engine, the account type of the account based only on class values in the identified set of transaction records.

9. The method of claim 1, wherein retrieving the plurality of transaction records from the remote computing device comprises retrieving, by the one or more processors, the plurality of transaction records responsive to each of the plurality of transaction records having a timestamp within a defined time period.

10. The method of claim 1, wherein determining the account type of the account comprises determining, by the one or more processors applying the rule-based engine, whether the account is a consumer account or a business account.

11. A system comprising:
a network interface;
a processor; and
a non-transitory, computer-readable medium comprising instructions which, when executed by the processor, cause the processor to:
store a mapping between class values and account types;
establish, via the network interface, a connection via one or more application programming interfaces (APIs) with each of a plurality of remote computing devices,
each of the plurality of remote computing devices corresponding to a different institution;
in response to receiving a request for an account type classification of an account,
the request including an identification of an institution corresponding to a remote computing device of the plurality of remote computing devices, retrieve, via the one or more APIs and over the connection with the remote computing device corresponding to the institution identified in the request, a plurality of transaction records each comprising a class value in a field-value pair corresponding to a class transaction attribute of the transaction record;
automatically determine, using a rule-based engine and based on the mapping between class values and account types, an account type of the account based only on a comparison between the class values in the plurality of transaction records and the mapping between class values and account types; and
generate instructions containing the determined account type of the account to a computing device configured to link the account to a profile stored in memory of the computing device and store an identification of the account type in an account type field-value pair for the linked account in the profile.

12. The system of claim 11, wherein the instructions cause the processor to retrieve the plurality of transaction records by transmitting, via the one or more APIs over the connection with the remote computing device, a query comprising an identification of the account to the remote computing device.

13. The system of claim 11, wherein the instructions cause the processor to determine the account type of the account by:
determining, using the rule-based engine, a most common class value of the class values of the plurality of transaction records; and
determining, using the rule-based engine, the account type based on the account type having a stored association with the determined most common class value in the mapping.

14. The system of claim 11, wherein the instructions cause the processor to determine the account type of the account by:
determining, using the rule-based engine, a set of two or more class values of the class values of the plurality of transaction records satisfy a criterion; and
determining, using the rule-based engine, the account type based on the account type having a stored association with the determined set of two or more class values in the mapping.

15. The system of claim 11, wherein the instructions cause the processor to determine the account type of the account by:
identifying, using the rule-based engine, a transaction record of the plurality of transaction records based on the transaction record including a most recent timestamp;
identifying, using the rule-based engine, a class value in the identified transaction record; and
determining, using the rule-based engine, the account type based on the account type having a stored association with the identified class value in the mapping.

16. The system of claim 11, wherein the instructions cause the processor to determine the account type of the account by:
determining, using the rule-based engine, a count of a class value within the class values of the plurality of transaction records satisfies a threshold; and
determining, using the rule-based engine, the account type based on the account type having a stored association with the class value with the count that satisfies the threshold in the mapping.

17. The system of claim 11, wherein the instructions cause the processor to determine the account type of the account by:
executing a machine learning model using the class values of the plurality of transaction records as input to cause the machine learning model to output the account type, wherein the machine learning model is trained based on historical class values of a plurality of historical transaction records.

18. The system of claim 11, wherein the instructions further cause the processor to:
identify a set of transaction records from the plurality of transaction records that include one of a defined set of class values,
wherein the instructions cause the processor to determine the account type of the account by determining, using the rule-based engine, the account type of the account based only on class values in the identified set of transaction records.

* * * * *